May 17, 1966 KIYOSHI KITAI 3,251,288
EXPOSURE SPEED REGULATION SYSTEM FOR USE IN CAMERA
Filed Oct. 8, 1963
6 Sheets-Sheet 6

United States Patent Office 3,251,288
Patented May 17, 1966

---

3,251,288
EXPOSURE SPEED REGULATION SYSTEM FOR USE IN CAMERA
Kiyoshi Kitai, Shinjuku-ku, Tokyo-to, Japan, assignor to Kabushiki Kaisha Hattori Tokeiten, Tokyo-to, Japan, a joint-stock company of Japan
Filed Oct. 8, 1963, Ser. No. 314,742
Claims priority, application Japan, Oct. 12, 1962, 37/44,117; Jan. 9, 1963, 38/799
4 Claims. (Cl. 95—62)

This invention relates to improvements of speed governor devices for use in cameras.

An essential object of this invention is to provide a system which makes possible an accurate speed regulation of the shutter blade opening time in a simple and free manner.

Another object of this invention is to provide a speed governor wherein speed accuracy of a camera shutter can be easily assured by means of a gear train.

Said objects and other objects, benefits and features of this invention will become more apparent upon consideration of a detailed description of preferred embodiments thereof, when taken in connection with the attached drawings, in which the same or equivalent members are designated by the same reference characters, and in which.

Figure 1:
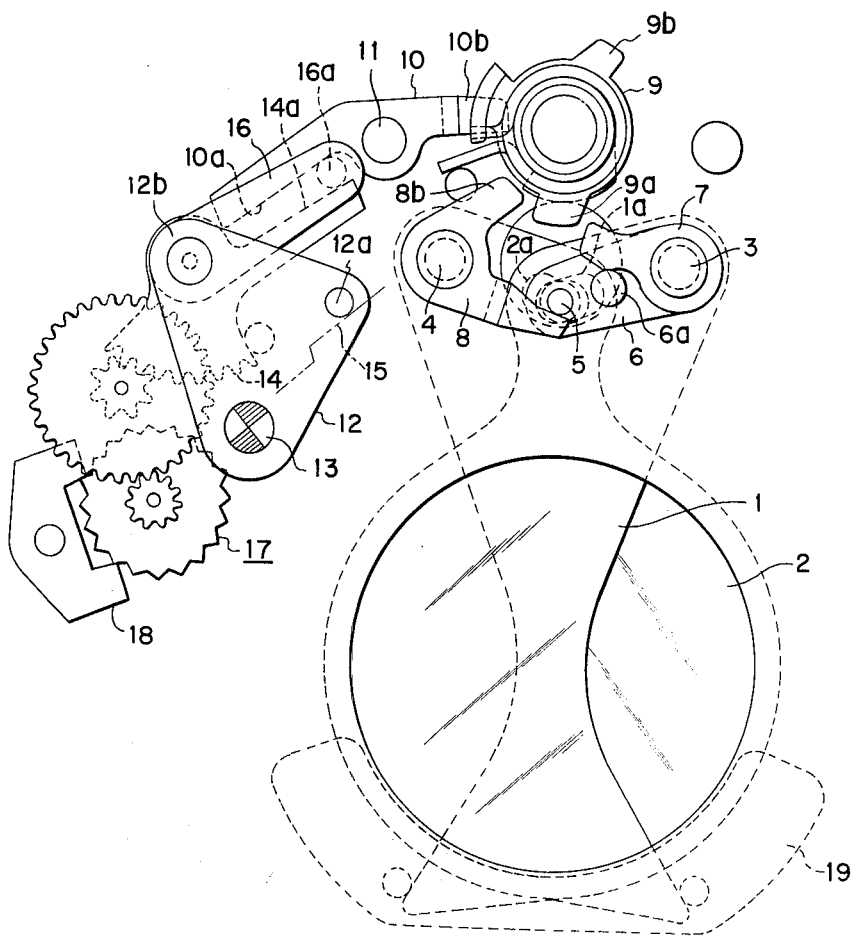
FIG. 1 is a plan view showing main portion of a shutter which is combined with a shutter speed regulating governor, in a cocked state, embodying the features of this invention.

The embodiment of the invention illustrated in FIGS. 1 to 4 comprises shutter blades 1 and 2 which are adapted to rotate around their fixed pins 3 and 4 respectively, a shutter blade actuating pin 5 which is fixed on a shutter blade actuating lever 6 which rotates together with the shutter blade 1 around the fixed pin 3, said shutter blade actuating pin 5 being engaged in the elongated apertures 1a and 2a of said shutter blades 1 and 2, a lever 7 for closing the shutter blades, said lever being always held in the counterclockwise direction with respect to the fixed pin 3, a stopper 6a for the closing lever 7, said stopper being fixed on the actuating lever 6, a shutter blade opening lever 8 which is supported rotatably with regard to the fixed pin 4, a main driving cam member 9, an intermediate lever 10 which rotates around a shaft 11, a supporting plate 12 which is rotatable around a shaft 13, said supporting plate 12 being provided with a shutter speed regulating pin 12a being in contact with a shutter speed regulating cam 15, and a movable pin supporting lever 16 having a movable pin 16a which is in contact with the cam surface 10a of the intermediate lever 10 as well as the cam surface 14a of a sector-gear 14. Said movable pin supporting lever 16 is provided, at its base portion, with a pivot 12b which is affixed to the supporting plate 12. The above embodiment comprises further a second-time gear train 17, an anchor 18, and a guide plate (or space holder) 19 for guiding the end portions of the shutter blades 1 and 2.

Figure 2:
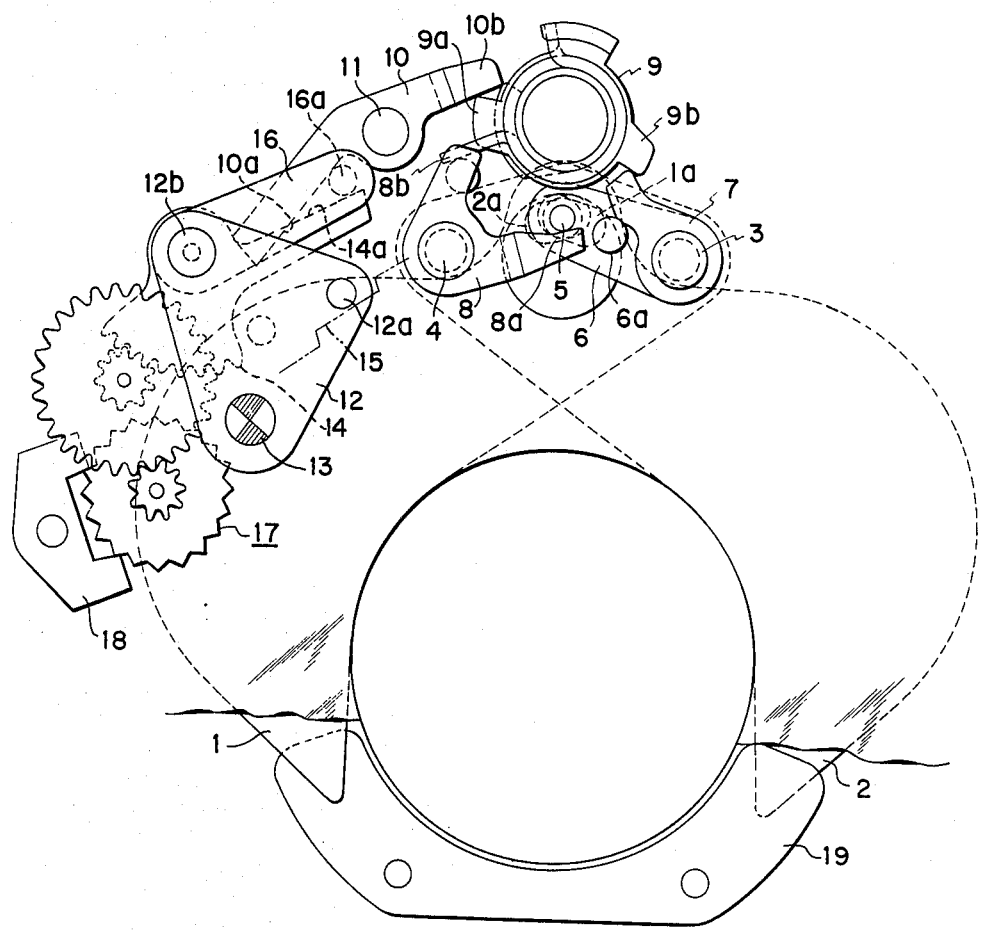
FIG. 2 is a plan view showing said main portion of the shutter shown in FIG. 1, with the shutter blades being in open states.

In the cocked state as shown in FIG. 1, when the release member is released, the main driving cam member 9 rotates clockwise and the projection 9a of said cam member 9 gets out of the position of the projection 8b of the shutter blade opening lever 8, whereby the shutter blade actuating pin 5 is pushed upward by other end 8a of said lever 8 and the shutter blades 1 and 2 are opened as shown in FIG. 2. Next, said projection 9a kicks one end 10b of the intermediate lever 10 which is in connection with the shutter speed regulating governor gear train, whereby the governor acts as a resistor during engagement of said projection 9a of the main driving cam member 9, with said one end 10b of the intermediate lever 10, thereby causing a predetermined lag to the rotation of the main driving cam member 9. Then, the other projection 9a of the main driving cam member 9 kicks the closing lever 7, whereby the shutter blade actuating pin 5 is pushed downward through the pin 6a and the actuating lever 6, thus closing the shutter blades.

In the following, the mechanism of the shutter speed regulating governor according to this invention will be explained.

Figure 3:
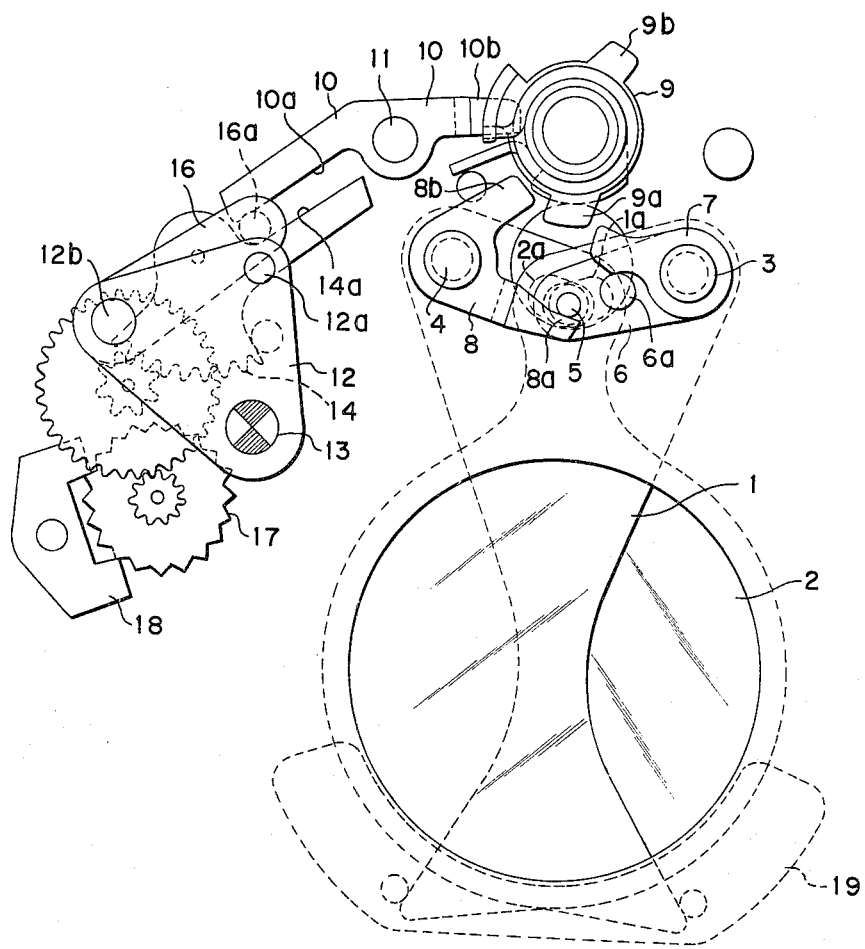
FIG. 3 and FIG. 4 are plan views corresponding to FIGS. 1 and 2 respectively, each being set in different state.
Figure 4:
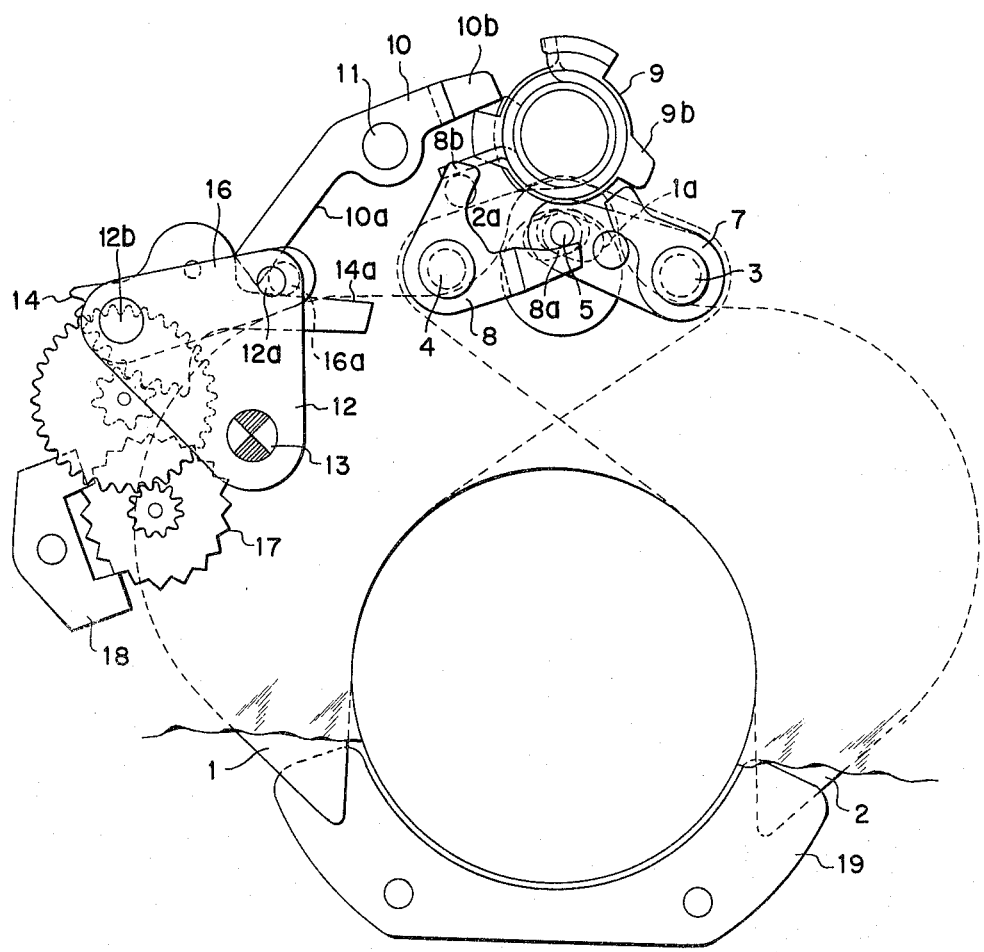

The movable pin 16a is arranged so that it can be displaced while keeping contact with both the one end of the sector-gear 14 of the shutter speed regulating governor and the one end of the intermediate lever 10, another end 10b of the intermediate lever 10 being able to engage with and disengage from the projection 9a of the main driving cam member 9, whereby the resistance imparted to the main driving cam member 9 from the governor is made to be adjusted by changing relative position between said movable pin 16a and the sector-gear 14 as well as the intermediate lever 10. That is, in accordance with said relative position, there will arise difference in working angle of the sector-gear 14 at the time when the main driving cam member 9 has got out of the intermediate lever 10. In cases of FIGS. 1 and 2, the movable pin 16a is closest to the middle of the intermediate lever 10 and also is adjacent to a point which is farthest from the rotation center of the sector-gear 14, so that the working angle of the sector-gear 14 is smallest. On the other hand, in the cases as shown in FIGS. 3 and 4, the movable pin 16a is closest to the end portion of the intermediate lever 10 and also is adjacent to a point which is closest to the rotation center of the sector-gear 14, so that, the working angle of the sector-gear 14 is largest. Thus, the position of the movable pin 16a can be adjusted arbitrarily by changing the position of the pivotal shaft 12b of the movable pin supporting lever 16 through the shutter speed regulating pin 12a by means of rotation of the shutter speed regulating cam 15.

Moreover, more accurate second-time adjustment can be attained by means of forming the cam surface 10a at one end of the intermediate lever 10, said surface being in contact with the movable pin 16a or the cam surface 14a at one end of the sector-gear 14 as an appropriate cam shape.

Thus, according to the above-mentioned embodiment, an accurate and free adjustment of the second-time in opening and closing of the shutter blades has been made possible by arranging a movable pin between an end of a sector-gear of conventional shutter speed regulating governor and an end of an intermediate lever being engaged with and disengaged from a main driving cam member and by varying the relative contact position between said movable pin and said ends.

In the above-mentioned embodiment, when the working angle of the first-gear of the governor is to be made large for the purpose of extending the regulating range of the shutter speed regulating governor consisting of a gear train, if the first-gear and the succeeding gear train make a consistent engagement action, it will become difficult to maintain accuracy, for example, of an intermediate shutter speed between high and low speeds. According to the present invention, maintenance of an accuracy of the shutter speed regulating governor can be made easily possible by means of a gear train such as described in the following embodiment.

Referring to FIGS. 5 to 8, the embodiment comprises shutter blades 1 and 2 which are adapted to rotate around the fixed pins 3 and 4 respectively, a shutter blade actuating pin 5 which is fixed on a shutter blade actuating lever 6 so as to cause the blades 1 and 2 to be rotated around the fixed pins 3 and 4, said shutter blade actuating pin 5 being engaged in the elongated apertures 1a and 2a of said shutter blades 1 and 2, a shutter blade closing lever 7 which is always held in the counterclockwise direction with respect to the fixed pin 3, a stopper 6a for closing the lever 7, said stopper being fixed on the actuating lever 6, a shutter blade opening lever 8 which is supported so as to be rotated with regard to the fixed pin 4, a main driving cam member 9, an intermediate lever 10 which rotates around a shaft 11, and a supporting plate 12 capable of rotating around a shaft 13 and provided with a shutter speed regulating pin 12a being in contact with a speed regulating cam 15 and a movable pin supporting lever 16 having a movable pin 16a clamped by the cam surface 10a of the intermediate lever 10 and the cam surface 14a of the sector-gear 14, said movable pin supporting lever 16 being rotatably supported at its base portion onto a plate 12 by means of a pin 12b.

The embodiment as illustrated in FIGS. 5 to 8 comprises further a second pinion 51 being engaged with the sector-gear 14 which rotates around a shaft 14b as the first gear, a second gear 52, a third pinion 53, a discontinuous wheel 54 which is secured fixedly to a third shaft 53a and supported to be rotated together with the third pinion 53 in unison, an escape wheel 17 which is freely supported by the third shaft 53a and provided with a pin 55 capable of entering into the discontinuous portion of said discontinuous wheel 54, and an anchor 18 which engages with the escape wheel 17.

Figure 5:
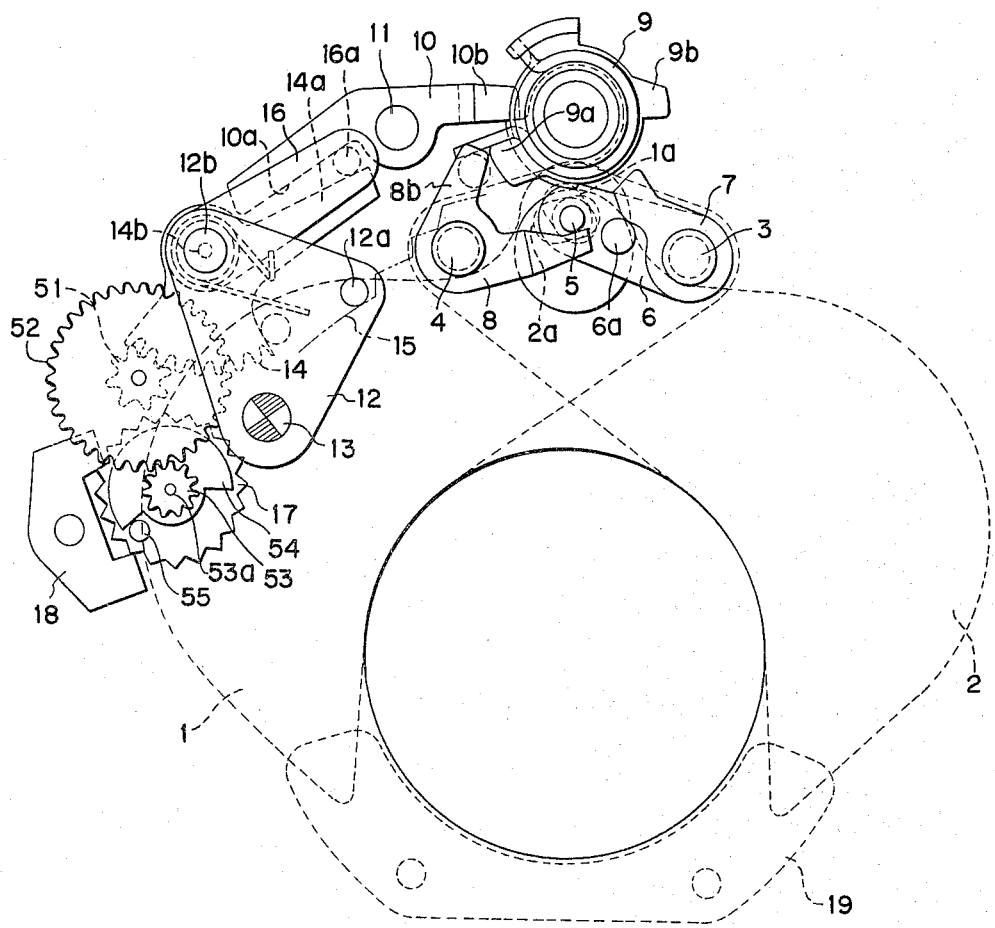
FIG. 5 is a plan view of another embodiment of this invention.
Figure 6:
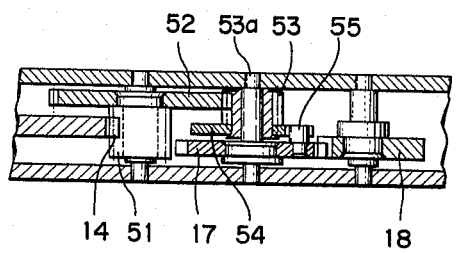
FIGS. 6 and 7 are a front elevational view and a plan view respectively, showing, in detail, the main portion of the embodiment of FIG. 5.
Figure 7:
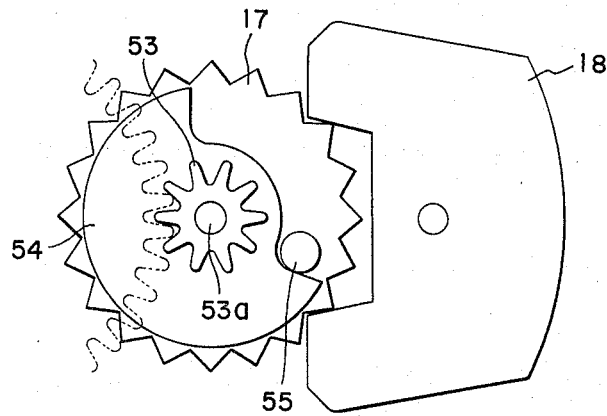
Figure 8:
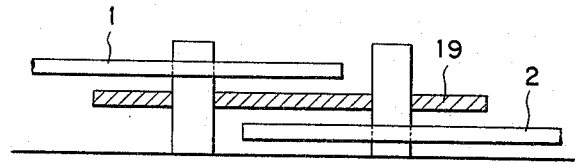
FIG. 8 is a front elevational view, showing in detail, the guide plate.

In the above embodiment, FIG. 5 shows a condition wherein a shutter which has been cocked is released, whereby the main driving cam member 9 is rotated clockwise, the cam projection 9a kicks an end 8b of the shutter blade opening lever 8, and another end of the lever 8 pushes upward the blade actuating pin 5, thus causing the shutter blades 1 and 2 to be brought in opened position. Therefore, when the projection 9a continues to rotate in clockwise direction, it will kick one end 10b of the intermediate lever 10 and during the engagement of the projection 9a with the end 10b of the intermediate lever 10, the intermediate lever 10 and the succeeding gear train will act as a resistance to the rotation of the main driving cam member, thereby imparting a predetermined lag to the rotation of said main driving cam member 9. That is, another projection 9b of the main driving cam member kicks the closing lever 7 and pushes down the shutter blade actuating pin 5 through the pin 6a and actuating lever 6, whereby the shutter blades' opening time can be adjusted.

The relationship between the projection 9a of the main driving cam member 9, the intermediate lever 10, and the succeeding gear train will be described as follows. A cam portion 14a at an end of the sector-gear 14 and a cam portion 10a at an end of the intermediate lever clamp a pin 16a, and said clamping position of the pin 16a is varied according to the advance or retreat of the lever 16 due to rotation of the plate 12, through the pin 12a, caused by the rotation of the speed regulating cam 15. Since the said change in location of the pin 16a is made with regard to the position of the intermediate lever 10, the sector-gear 14 rotates by an angle corresponding to said location change around the shaft 14b as being pushed by the pin 16a, and thereby the working angle relative to the second pinion 51 will be changed. On the other hand, since the pin 16a is being held between the intermediate lever and the sector-gear and constitutes a transmission element of a driving force imparted from the intermediate lever 10 for driving the sector-gear 14, the positional change of the pin 16a will also change the ratio of force for driving. Therefore, in a condition as shown in FIG. 5, when the projection 9a of the main driving cam member makes further advance in a clockwise direction and starts to kick the intermediate lever 10, the sector-gear 14 will cause the members 51 and 52 to rotate and the second gear 52 will cause the third pinion 53 and discontinuous wheel 54 to rotate. The said discontinuous wheel will rotate for a while and, upon contact of a discontinuous edge with the pin 55, will cause the escape wheel 17 and the anchor 18 to vibrate. Thus, if the pin 16a is at a position as indicated, the discontinuous edge of the wheel 54 will be farthest from the pin 55, thereby the time required for actuating the anchor 18 will become the shortest. Therefore, the resistance limiting the rotation of the projection 9a of the main driving cam member of the gear train will be made to be lowest and the opening time of the shutter blades 1 and 2 will become the shortest. When the position of the pin 16a becomes lower in the drawing due to the rotation of the shutter speed regulating cam 15, the discontinuous wheel and escape wheel will come closer in proportion to the magnitude of said movement, whereby the anchor actuating time, i.e., the resistance of the gear train will increase and the opening time of the shutter blades will become the longest.

If the wheel and gears between the first gear and the anchor are engaged with one another without intermittence and the driving force being applied to the first gear is constant, the anchor will vibrate in proportion to a change in working angle of the first gear. However, if the said driving force is changed, the vibration of the anchor will not be proportional thereto. That is, the resistance will fluctuate, thus making it difficult to maintain second-time accuracy of shutter speed regulation in the intermediate range. However, according to this invention, it has become possible to realize the improvement in the shutter speed regulating accuracy, expansion of the speed regulation range, and minute speed regulation, because an intermittent gear train is provided and the magnitude of the intermittence of said gear train is made to change in correspondence to both a change in driving force of the first gear and that in the working angle.

While the invention has been explained by describing particular embodiments thereof, it will be apparent that improvements and modifications may be made without departing from the scope of the invention as defined in the appended claims.

What is claimed is:

1. In a camera having shutters, a shutter operating mechanism having a driven member for operating said shutter operating mechanism, a shutter speed governor for variably retarding said shutter operating mechanism thereby variably adjusting the operating speed of said shutters, a pivoted lever intermediate said shutter operating mechanism and said shutter speed governor for operably coupling said mechanism and said governor, means providing a fixed first pivot for said lever, an adjustable member cooperative with said lever and said governor to operably associate them and adjustable independently of said shutter operating mechanism and said governor for adjusting the retardation of said shutter operating mechanism by said shutter speed governor, said governor comprising an angularly rotated second lever variably rotatable different angular extents to variably retard said shutter speed governor, and said adjustable member comprising an adjustable pivot for said second lever to variably adjust the extent of angular rotation of said second lever and the leverage effect of said first and second levers.

2. In a camera having shutters, a shutter operating mechanism having a driven member for operating said shutter operating mechanism, a shutter speed governor for variably retarding said shutter operating mechanism thereby variably adjusting the operating speed of said shutters, a pivoted lever intermediate said shutter operating mechanism and said shutter speed governor for operably coupling said mechanism and said governor, means providing a fixed first pivot for said lever, adjustable means cooperative with said lever and said governor to operably associate them and adjustable independently of said shutter operating mechanism and said governor for adjusting the leverage of said lever and force applied by said lever to retard said mechanism and thereby variably effect retardation of said shutter operating mechanism by said shutter speed governor, said governor comprising an angularly rotated second lever variably rotatable different angular extents to variably retard said shutter speed governor, and said adjustable means comprising an adjustable pivot for said second lever to variably adjust the extent of angular rotation of said second lever and the leverage effect of said first and second levers.

3. In a camera having shutters, a shutter operating mechanism having a driven member for operating said shutter operating mechanism, a shutter speed governor for variably retarding said shutter operating mechanism thereby variably adjusting the operating speed of said shutters, a pivoted lever intermediate said shutter operating mechanism and said shutter speed governor for operably coupling said mechanism and said governor, means providing a fixed first pivot for said lever, an adjustable member cooperative with said lever and said governor to operably associate them and adjustable independently of said shutter operating mechanism and said governor for adjusting the retardation of said shutter operating mechanism by said shutter speed governor, said governor comprising a pivoted retardation gear sector, means defining a second pivot for said gear spaced from said first pivot and having a surface engaging said adjustable member, said lever having a surface engaging said adjustable member, said lever having a surface cooperative with said adjustable member, said adjustable member comprising a pin variably movable away from and toward said first pivot in a direction toward and away from said second pivot for variably varying the angle of rotation of said retardation gear sector, both of the surfaces disposed extending between said first and second pivots, and said pin being disposed between said surfaces.

4. In a camera according to claim 3, in which said surfaces are substantially straight surfaces.

References Cited by the Examiner

UNITED STATES PATENTS

| 2,119,831 | 6/1938 | Riddell | 95—62 |
| 2,475,952 | 7/1949 | Fuerst | 95—62 |
| 2,827,839 | 3/1958 | Fuerst | 95—58 |
| 3,093,048 | 6/1963 | Starp | 95—63 |
| 3,146,689 | 9/1964 | Singer | 95—63 |

FOREIGN PATENTS 577,042  8/1930  Germany.

JOHN M. HORAN, *Primary Examiner.*